UNITED STATES PATENT OFFICE.

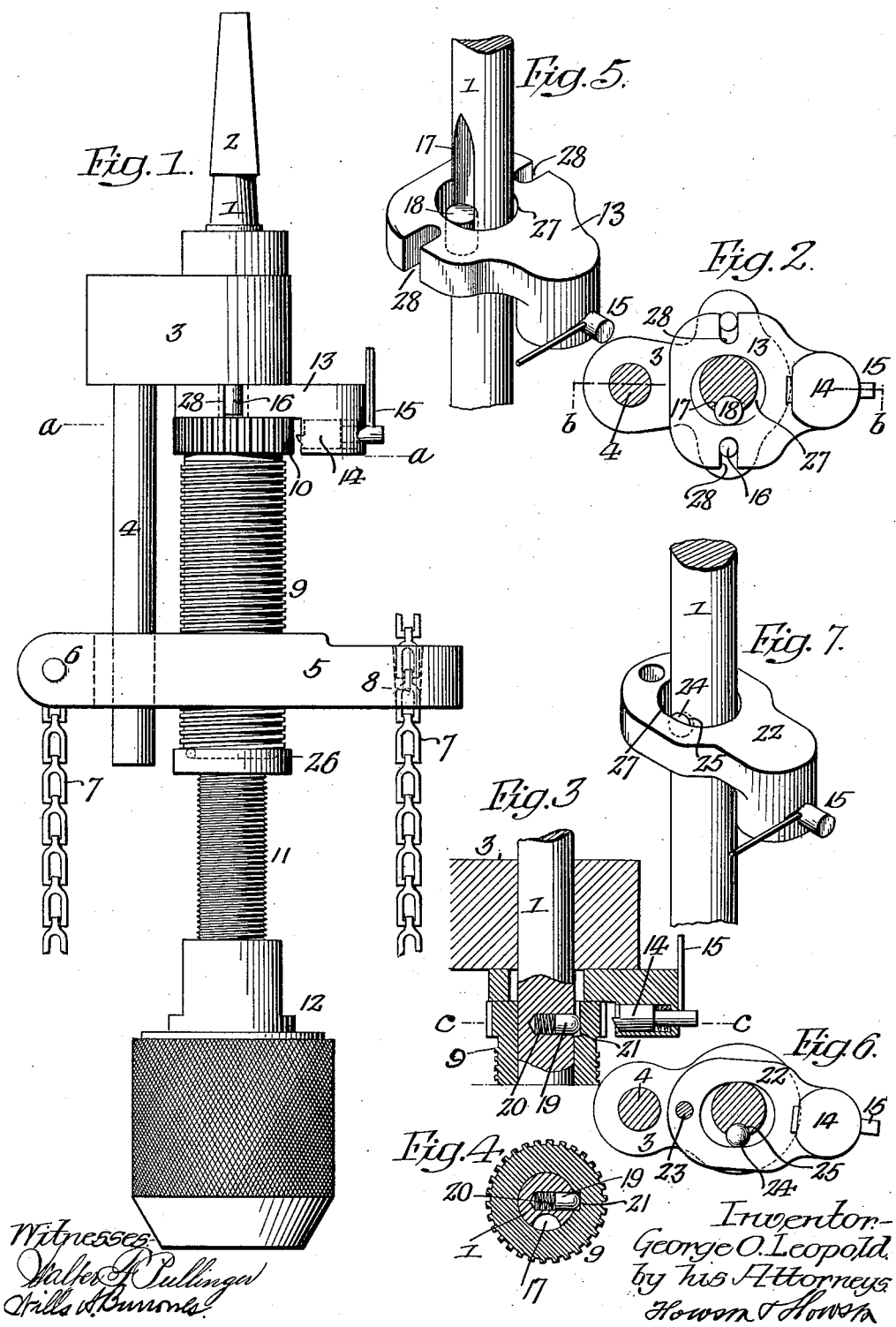

GEORGE O. LEOPOLD, OF PHILADELPHIA, PENNSYLVANIA, ASSIGNOR TO NORTH BRO'S. M'F'G CO., OF PHILADELPHIA, PENNSYLVANIA, A CORPORATION OF PENNSYLVANIA.

CHAIN-DRILL.

1,033,712.

Specification of Letters Patent. Patented July 23, 1912.

Application filed April 17, 1912. Serial No. 691,302.

*To all whom it may concern:*

Be it known that I, GEORGE O. LEOPOLD, a citizen of the United States, residing in Philadelphia, Pennsylvania, have invented certain Improvements in Chain-Drills, of which the following is a specification.

My invention relates to certain improvements in drill mechanism, known as chain drills, in which the drill tool or spindle is attached to the work through the medium of a chain; means being provided for automatically feeding the tool to the work.

One object of my invention is to improve the construction of the feeding mechanism and to reduce the cost of manufacturing a tool of this type.

A further object of the invention is to provide means for allowing the slack of the chain to be taken up by turning the spindle until a certain pressure is exerted, when the ratchet mechanism will be automatically applied.

In the accompanying drawings:—Figure 1, is a side view of my improved chain drill; Fig. 2, is a sectional plan view on the line a—a, Fig. 1; Fig. 3, is a sectional view on line b—b, Fig. 2; Fig. 4, is a sectional plan view on the line c—c, Fig. 3; Fig. 5, is a perspective view illustrating one feature of the invention; and Figs. 6 and 7, are views illustrating modifications of the invention.

Referring to the drawings, 1 is a spindle having a squared end 2 adapted to a brace, in the present instance, by which the spindle is turned. This spindle may form part of the breast drill, or may be coupled to it in any manner desired. The spindle extends through a carrier 3 from which depends a rod 4. This rod extends through the opening in the chain grip head 5, having a pin 6 at one end to which the chain 7 is attached and a tapered slot 8 to which the free end of the chain may be attached so that the chain, when it is passed over the work, may be attached to this grip head in order to confine the tool to the work.

The grip head has a screw threaded opening and extending through this opening is a threaded stem 9, having a ratchet wheel 10 at its upper end. The spindle 1 extends through the stem 9 and secured to its lower end is a threaded section 11 on which the chuck 12 is mounted. This threaded section forms part of the chuck, in the present instance.

26 is a collar resting on a shoulder formed by the threaded section 11 and located between the collar and the lower end of the threaded stem is a series of anti-friction balls, Fig. 1. Mounted between the carrier and the ratchet wheel 10 is a pawl piece 13, having an extension in which is located the pawl 14, operated by a handle 15, and back of the pawl is a spring tending to force the tooth of the pawl into engagement with the ratchet wheel. The tooth is beveled at one side and can be turned to the right or to the left so as to move the ratchet wheel in either direction and, when moved to the central position, as in Figs. 1 and 3, the pawl will be clear of the ratchet wheel. The pawl piece 13 has an enlarged opening 27 in the center through which the spindle 1 extends and at each side of the pawl piece are slots 28 into which extend pins 16 on the carrier 3.

The spindle has a vertical slot 17 in which is mounted a roller 18. This roller bears against the side walls of the opening 27 in the pawl piece 13 and as the spindle turns this roller acts as a cam to reciprocate the pawl piece 13 and rolls not only against the surface of the opening 27, but also in the slot 17 of the spindle; considerably reducing the friction.

In order to allow the tool to take up the slack in the chain before operating the ratchet mechanism, I connect the spindle with the threaded stem 9 through a spring pin or ball 19, Fig. 3, which is mounted in an opening in the stem and back of the pin is a spring 20. The pin has a rounded end and is adapted to a slot 21 in the stem 9 so that the stem is connected to the spindle until the slack in the chain is taken up and when the tension of the chain overcomes the pressure of the spring, the pin will be forced back independently of the screw stem.

If the pawl is set to feed the stem forward, then, at each revolution of the spindle, the screw stem will be fed forward a distance equal to a tooth of the ratchet wheel.

In Figs. 6 and 7, I have shown a pawl piece 22 pivoted at 23 to a pin on the carrier 3 and instead of the roll 18, illustrated in Fig. 5, a ball 24 is used, adapted to a socket 25 in the spindle 1, as it will be understood that the ball may be substituted for the roller, but I prefer the roller as it has a more extended bearing surface.

When this invention is to be used, the drill or other tool is secured in the chuck and the chain is passed around the work; the free end of the chain being secured to the cross head 5. The spindle can be turned by a brace; breast drill; or other turning device, and, as the spindle is turned, the screw stem 9 is turned with it—taking up the slack in the chain until the tension on the chain overcomes the pressure of the spring back of the pin 19, which locks the screw stem to the spindle; the pin being retracted and the spindle turned free of the stem. The pawl can then be turned to engage the ratchet wheel to feed the stem forward as the drill acts upon the work. The stem 9 is fed forward one tooth of the ratchet wheel at each revolution of the spindle; the thread of the stem and the teeth of the ratchet wheel being so proportioned that this feeding of the spindle forward will be about equal to the amount of the cut of the drilling tool; there being no likelihood of the drill breaking down from over feeding.

As the spindle rotates, the roller carried by the spindle reciprocates or vibrates the pawl piece; giving the necessary motion to the tool to allow it to turn the ratchet wheel the amount desired.

I claim:

1. The combination in a chain drill, of a spindle; a screw stem; a cross head engaged by the screw stem; a chain secured to the cross head and engaging the work; a ratchet wheel on the end of the screw stem; a pawl piece having an enlarged opening through which the screw stem passes; a pawl carried by the pawl piece; and a roller carried by the spindle and arranged to engage the pawl piece so as to cause the pawl to feed the stem through the medium of the ratchet wheel.

2. The combination in a chain drill, of a spindle; a screw stem; a cross head having an enlarged opening adapted to receive the screw stem; a chain attached to the cross head and arranged to engage the work; a ratchet wheel on the stem; a pawl piece; a pawl carried thereby arranged to engage the ratchet wheel; said stem having a recess therein; a roller mounted in the recess; said pawl piece having an enlarged opening through which the stem extends; the roller bearing against the wall of this opening in the pawl piece so that as the stem is rotated, the pawl piece is actuated to rotate the ratchet wheel.

3. The combination of a spindle; a screw stem; a screw head on the screw stem; a chain connected to the cross head; a carrier through which the spindle extends; said carrier being connected to the cross head; pins on the carrier; a pawl piece having an enlarged opening through which the stem extends; said pawl piece also being slotted at each side to receive the pins of the carrier; a roller carried by the spindle and located in the opening in the pawl piece so as to reciprocate the pawl piece when the spindle is turned; a pawl on the pawl piece; and a ratchet wheel on the screw stem engaged by the pawl.

4. The combination of a spindle; a carrier through which the spindle extends; a screw stem mounted on the spindle; a cross head having a threaded opening through which the stem extends; a rod connecting the carrier to the cross head; a chain secured to the cross head; means for turning the stem as the spindle is turned; a yielding pin on the spindle; the stem being slotted to receive the end of the pin so that the screw stem will turn with the spindle to take up the slack in the chain and when the slack is taken up, the spindle will turn independently of the stem.

5. The combination of a spindle having a recess therein; a roller mounted in the recess; a ratchet wheel on the spindle; a carrier; and a pawl carried thereby; the roller acting upon the carrier to move the pawl to actuate the ratchet wheel.

In testimony whereof, I have signed my name to this specification, in the presence of two subscribing witnesses.

GEORGE O. LEOPOLD.

Witnesses:
Jos. H. Klein,
Wm. A. Barr.